(12) United States Patent
Pawellek et al.

(10) Patent No.: US 11,746,827 B2
(45) Date of Patent: Sep. 5, 2023

(54) STEAM LEAKAGE COMPACT BEARING

(71) Applicant: NIDEC GPM GmbH, Auengrund OT Merbelsrod (DE)

(72) Inventors: Franz Pawellek, Lautertal (DE); Marcel Berner, Hildburghausen (DE)

(73) Assignee: NIDEC GPM GmbH, Auengrund Ot Merbelsrod (DE)

( * ) Notice: Subject to any disclaimer, the term of this patent is extended or adjusted under 35 U.S.C. 154(b) by 0 days.

(21) Appl. No.: 17/766,012

(22) PCT Filed: Aug. 3, 2020

(86) PCT No.: PCT/EP2020/071771
§ 371 (c)(1),
(2) Date: Apr. 1, 2022

(87) PCT Pub. No.: WO2021/069125
PCT Pub. Date: Apr. 15, 2021

(65) Prior Publication Data
US 2022/0325756 A1 Oct. 13, 2022

(30) Foreign Application Priority Data
Oct. 8, 2019 (DE) .......................... 102019126968.7

(51) Int. Cl.
*F16C 33/10* (2006.01)
*F16C 33/74* (2006.01)
(Continued)

(52) U.S. Cl.
CPC ........ *F16C 33/743* (2013.01); *F04D 29/0462* (2013.01); *F04D 29/061* (2013.01);
(Continued)

(58) Field of Classification Search
CPC .... F16C 33/104; F16C 33/741; F16C 33/743; F16C 33/762; F16C 33/763;
(Continued)

(56) References Cited

U.S. PATENT DOCUMENTS 2,692,559 A * 10/1954 Rogers .................. F04D 29/061
415/230
3,358,607 A 12/1967 Seamans
(Continued)

FOREIGN PATENT DOCUMENTS

DE 908812 4/1954
DE 102007001527 A1 7/2008
(Continued)

OTHER PUBLICATIONS

International Search Report and Written Opinion dated Oct. 16, 2020 for corresponding International Application No. PCT/EP2020/ 071771 filed Aug. 3, 2020 (9 pages) with WIPO machine translation (3 pages).
(Continued)

*Primary Examiner* — Phillip A Johnson
(74) *Attorney, Agent, or Firm* — Daniel F. Nesbitt; Nesbitt IP LLC

(57) ABSTRACT

The invention relates to a shaft bearing having a seal arrangement to prevent steam leakages that can occur in the event of temperature fluctuations or pressure fluctuations between a liquid medium on the one side and a gaseous medium on the other side of the compact bearing, wherein, between a primary radial seal and a rotation bearing portion, a lubrication space surrounding a shaft circumference is arranged that receives a volume of lubricating grease that has a higher viscosity than a lubricating oil and a coolant; and a volume compensator for compensating a temperature-dependent volume fluctuation is provided that comprises a
(Continued)

compressible material, and is arranged vertically in interaction with the volume of the lubricating oil and/or the volume of the lubricating grease.

20 Claims, 1 Drawing Sheet

(51) Int. Cl.
  *F04D 29/10* (2006.01)
  *F04D 29/046* (2006.01)
  *F04D 29/06* (2006.01)

(52) U.S. Cl.
  CPC .......... *F04D 29/108* (2013.01); *F16C 33/104* (2013.01); *F16C 2360/44* (2013.01)

(58) Field of Classification Search
  CPC .............. F16C 2360/44; F16C 2360/45; F04D 29/0462; F04D 29/061; F04D 29/108
  See application file for complete search history.

(56) References Cited

U.S. PATENT DOCUMENTS

| | | | | |
|---|---|---|---|---|
| 3,387,153 A | * | 6/1968 | Grad | .................... F04D 25/0606 |
| | | | | 310/90 |
| 4,039,229 A | | 8/1977 | Ohlberg | |
| 4,737,673 A | * | 4/1988 | Wrobel | ................. F04D 29/057 |
| | | | | 310/90 |
| 2003/0198554 A1 | * | 10/2003 | Ray | ....................... F04D 29/108 |
| | | | | 415/113 |

FOREIGN PATENT DOCUMENTS

| | | |
|---|---|---|
| DE | 102018123901 A1 | 4/2020 |
| KR | 100262365 B1 * | 8/2000 |

OTHER PUBLICATIONS

First Office Action dated Aug. 13, 2020 in related German Application No. 10 2019 126 968.7 filed Oct. 8, 2019 (4 pages) with Google machine translation (3 pages).

International Preliminary Report on Patentability (Chapter II) dated Jul. 28, 2021 or corresponding International Application No. PCT/EP2020/071771 filed Aug. 3, 2020 (12 pages) with WIPO translation (3 pages).

* cited by examiner

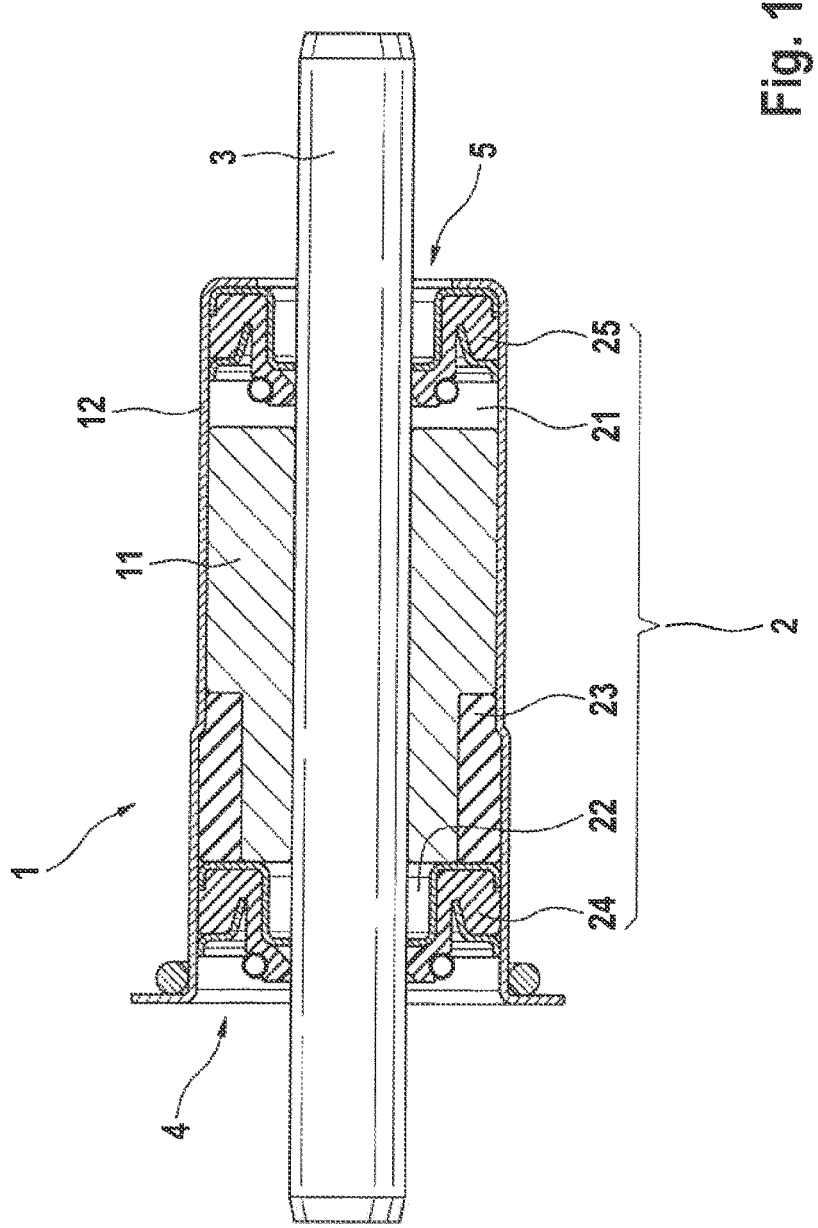

STEAM LEAKAGE COMPACT BEARING

CROSS-REFERENCE TO RELATED APPLICATIONS

The present application is a National Stage Entry of International Application Number PCT/EP2020/071771, filed Aug. 3, 2020, which claims the benefit of German Application Number DE102019126968.7, filed Oct. 8, 2019, the disclosures of which are hereby incorporated by reference in their entireties.

FIELD OF THE INVENTION

The invention relates to a compact bearing having a sealing arrangement to prevent steam leakages which can occur in the event of temperature variations or pressure variations between a liquid medium on one side and a gaseous medium on the other side of the compact bearing.

BACKGROUND OF THE INVENTION

In the technical field of pumps and turbo-machines, structural measures are known in the prior art which serve to seal a drive shaft between a delivery medium, which is carried in a pump chamber, with respect to a drive side. For example, in the construction of a pump housing, a leakage chamber is arranged between a shaft seal on a pump chamber and a shaft bearing located downstream thereof. A small leakage flow which breaches the shaft seal on the pump chamber is captured by the leakage chamber and evaporates at an operating temperature through a discharge line. This prevents the leakage flow from reaching the shaft bearing located downstream thereof or an electric motor located downstream thereof from being exposed to moisture. This feature for sealing a shaft to prevent a leakage flow requires considerable installation space.

In addition, leakage chambers are only effective to a limited extent against so-called steam leakages which can occur when a liquid delivery medium is heated and the pressure thereof rises in the pump chamber to the drive side. In this case, pressure equalisation is achieved between two axial sides of a shaft seal. In the event of a steam leakage, gas volumes having a high moisture content pass through the shaft seal, whilst pressure equalisation occurs. In contrast to the liquid droplets of a leakage flow, the fine droplets in the moisture-laden gas volumes cannot be separated by gravity at the leakage chamber and can be deposited as condensate on a shaft bearing, located downstream thereof, an electric motor or the like.

Furthermore, a structural measure is known from high-pressure pumps or gas compressors which permits hermetic sealing of a shaft, i.e. also sealing of steam leakages. In this case, a barrier fluid flows around a shaft portion delimited between two seals, said fluid being supplied under pressure in a housing and, depending on the design, also being discharged including a bound leakage. For this purpose, means are required for delivery and pressure regulation of the circuit or at least the supply of the barrier fluid in dependence upon operating parameters, such as a delivery pressure or the like. Such measures for the gas-tight sealing of a shaft are associated with high costs owing to the complexity and in turn require considerable installation space.

When using shaft bearings in a water pump, the shaft bearing must be protected against the ingress of a coolant leakage from the delivery flow of the water pump. In general, both sliding bearings and rolling element bearings are sensitive to the ingress of moisture because the materials used, in particular suitable steels of the rolling elements and raceways, are not sufficiently corrosion-resistant for use in moisture. The occurrence of a coolant leakage leads to the reduction in the surface quality of the rolling elements and raceways as a result of corrosion. Higher friction at the rolling elements can lead to bearing damage by reason of corresponding heat development, which results in a defect of the water pump. In addition, water pumps are increasingly electrically driven, wherein an electric motor of the dry-runner type is frequently used on the drive-side. Just like the shaft bearing, the electric motor must also be protected against the ingress of a coolant leakage from the delivery flow from the water pump.

A shaft seal is subject per se to frictional wear and embrittlement by reason of pressure and temperature variations. It often constitutes the limiting factor in the service life of a pump. Therefore, in terms of the operating reliability of a vehicle great importance is placed on a durable liquid seal between the delivery flow in a pump chamber and the shaft bearing and the downstream drive-side region of a pump housing.

As a rule, conventional shaft bearings, such as e.g. rolling bearings, are sealed by radially acting seals, i.e. sealing washers which are integrated in the shaft bearing. Furthermore, separate sealing arrangements with respect to a shaft bearing are known from the prior art, whereby an individual adaptation of the sealing property to application-specific pressures and dimensions as well as greater freedom in the selection of bearing types are rendered possible. Such separate seals of pump shafts with respect to static components of a housing are often designed as double lip systems with a small lip spacing. A very small amount of lubricating grease is introduced into the intermediate space as initial lubrication. However, after some time the lubricating grease is used up and a coolant leakage penetrates the intermediate space. The poorer lubricating effect of the coolant leads to increased wear of the sealing lips.

Furthermore, the service life of shaft sealing rings depends greatly upon the lubricating conditions at the sealing lip. A dry-running sealing lip or a sealing lip which is lubricated merely by a coolant leakage has a shorter service life than sealing lips in an environment of a lubricating oil-carrying system by reason of the coefficient of friction of the missing lubricating film or a phenomenon explained hereinafter. When sealing lips are lubricated by a coolant, the phenomenon of deposit formation under the dynamic sealing surface of the sealing lip has been observed, which impairs the sealing function over a sustained period. This is caused by leakage drops of a coolant which vaporise upon passing through the sealing point and leave behind crystalline components of the coolant which form a deposit on the shaft.

Accordingly, there is a need for durable sealing solutions for protecting shaft bearings which permit a compact design, especially for compact pump designs, such as coolant pumps in the automotive sector. More precisely, there is a need for a compact bearing having an integrated sealing arrangement which combines the function of the shaft bearing and the function of a shaft seal with the desired sealing effect in one component.

Patent application DE 10 2018 123 901.7, which was not yet published on the filing date of this patent application and is by the same applicant, relates to such a sliding bearing having an integrated sealing arrangement for water pumps which are driven by a dry-running electric motor. In the sliding bearing, a so-called solid oil is provided as a lubricant reservoir which, in addition to the lubricating function, also fulfils a sealing function between a wet and a dry side.

SUMMARY OF THE INVENTION

An object of the present invention is to provide an alternative structure of a shaft bearing having an integrated sealing arrangement which is developed such that an increased sealing effect to prevent steam leakages is provided.

The object is achieved by the features of claim 1. The shaft bearing having a sealing arrangement is characterized in particular by the fact that a grease chamber surrounding a shaft circumference and receiving a volume of a lubricating grease having a higher viscosity than a lubricating oil and the coolant is arranged between a primary radial seal and a rotary bearing portion; and a volume compensator including a compressible material is provided for compensating for a temperature-dependent volume variation and is arranged such that it interacts with the volume of the lubricating oil and/or the volume of the lubricating grease.

On the one hand, the invention provides for the first time the use of two different lubricants with different viscosities in a shaft bearing.

The use of a lubricating grease in addition to the lubricating oil increases the service life of the lubricant filling in the shaft bearing. The lubricating grease prevents, directly behind the primary radial seal, the slightest coolant leakages from being drawn into the lubricating oil. In particular, the higher viscosity of the lubricating grease counteracts the penetration of predominantly gaseous steam leakages. Long-term washing of the lubricating oil out of the shaft bearing by reason of more or less gaseous steam leakages and coolant leakages can thus be suppressed.

The inventive provision and arrangement of the grease chamber in the shaft bearing thereby increases both the service life of the shaft bearing and a sealing effect.

The radial seal to the coolant side is arranged adjacent to, or in contact with, the grease chamber and is supplied with lubricating grease. A dynamic sealing surface of the corresponding sealing lip is always wetted with a lubricating film and the formation of deposits on the shaft by coolant residues is suppressed. Likewise, the opposite radial seal to the air side or drive side is supplied from a lubricating oil filling and so the corresponding sealing lip having a lubricating film slides on the shaft. The radial seals lubricated with lubricant achieve a considerably longer service life in comparison with coolant-lubricated sealing rings.

On the other hand, the invention provides for the first time the use, in a shaft bearing, of a volume compensator for compensating for a temperature-dependent volume variation of a lubricant.

The volume compensator compensates for an increase in the volume of a lubricant, in particular the total volume of the lubricating oil in the shaft bearing, which is caused by a rise in temperature. Therefore, a rise in an internal pressure in the shaft bearing or a pressure difference between the shaft bearing and an outer side of the shaft bearing can be limited.

Therefore, the inventive provision of the volume compensator counteracts a loss of lubricant at high operating temperatures as well as a possible entry of steam leakage by reason of a lost lubricant volume during cooling. Furthermore, a volume of the lubricant filling, which constitutes a barrier against steam leakage, is maintained for a long time.

The inventive structure of the volume compensator, which achieves the desired function by means of a compressible material, permits a simple, reliable as well as cost-effective and compact design of the volume compensator. The aspect of the compact design in turn allows integration of the volume compensator in the sealing arrangement, i.e. in particular integration of an increased sealing effect to prevent steam leakages in a compact bearing. In comparison with designs having a leakage chamber, in spite of a reliable seal, a design of the housing can be simplified, an installation space and material costs can be saved and more compact overall dimensions can be achieved.

By designing an elastic behaviour of the compressible material provided in accordance with the invention, a pressure-dependent function of the volume compensation can be predetermined in a simple manner without a need for regulation and control means and can be optimised to the operating conditions of the application. Moreover, labyrinth seals or similarly structured seals can be replaced by more favourable sealing rings or radial seals having a comparatively simply configured sealing lip.

The reliable sealing of the sliding bearing enables the use of a corresponding shaft bearing having the sealing arrangement in applications with moisture-sensitive assemblies, such as in particular an electric motor of the dry-runner type or electronics. Dry-runners have a higher efficiency by reason of a smaller air gap between the rotor and stator and are more cost-effective compared to wet-runners, because they can be purchased as a separate unit with standardised components, i.e. independently of a type-specific geometry of a pump. Consequently, the shaft bearing having the sealing arrangement is suitable for use as a compact bearing which is sealed to prevent steam leakages, i.e. as a single unit for mounting and sealing a pump shaft, in electrically driven coolant pumps.

Advantageous developments of the inventive shaft bearing having the sealing arrangement are the subject matter of the dependent claims.

According to one aspect of the invention, the volume compensator can be formed of a closed-cell elastomer. Elastomers or cellular rubber have a suitable elasticity to be compressed by a thermal expansion of a lubricant volume in contact therewith. In addition, foamed elastomers are cost-effectively available in various degrees of hardness. The closed-cell structure prevents the elastomer from becoming saturated with the lubricating oil like a sponge and consequently from becoming almost incompressible.

According to one aspect of the invention, the volume compensator can be formed annularly. This configuration allows a maximum compensation volume to be used in an axial installation space required for the volume compensator.

According to one aspect of the invention, the volume compensator can be arranged between the volume of the lubricating grease and a total volume of the lubricating oil which includes the rotary bearing portion and the oil chamber. In this arrangement, the volume compensator can easily be brought into contact with the lubricating grease and the lubricating oil, and so an interaction is established with both volumes of the lubricants. In the case of suitable dimensions of an annular configuration, the volume compensator can advantageously form a separation between the two lubricants at the same time.

According to one aspect of the invention, the rotary bearing portion can be provided by a sliding bearing bushing formed of a porous sintered metal and impregnated with the lubricating oil. A sliding bearing bushing is advantageously suitable for providing a compact bearing, because it can serve as a single shaft bearing if axial dimensions are sufficient, whereas a rolling bearing must be provided at two axially spaced bearing points, or at least in the form of a rolling bearing with two rows of rolling elements. The use of an oil-impregnated sliding bearing bushing enables the use of a very small running clearance to the shaft. A correspondingly small running clearance of such a radial shaft bearing reduces a deflection of the sealing lips as well as a pumping effect resulting from this between two axial sides. Furthermore, the small running clearance to the shaft produces a sealing gap between two axial sides which is advantageous for the desired sealing effect and which is not provided in a rolling bearing.

According to one aspect of the invention, the volume compensator can be accommodated in a radially external cut-out of the sliding bearing bushing. By configuring an axial overlap of the elements, a total dimension of the compact bearing can be minimised.

According to one aspect of the invention, the grease chamber can be accommodated in a radially inner cut-out of the primary radial seal. By configuring an axial overlap of the elements, a further minimisation of the required axial installation space for the sealing arrangement in the compact bearing can be minimised.

According to one aspect of the invention, the oil chamber can be arranged between the secondary radial seal and the rotatory bearing portion and surround a shaft circumference. This configuration and arrangement of the oil chamber in the shaft bearing improves lubrication of the sealing lip of the secondary radial seal and increases the service life thereof.

According to one aspect of the invention, a sealing lip of the primary radial seal and a sealing lip of the secondary radial seal can be formed pointing in the direction of the coolant side in relation to a shaft circumference. This configuration increases a sealing property in relation to the ingress of dirt particles from the coolant side to the inner side as well as in relation to a leakage of the lubricating oil to the air side.

Furthermore, according to one aspect of the invention, the shaft bearing having the sealing arrangement can comprise a bearing housing that collectively surrounds the rotatory bearing portion, the primary radial seal, the secondary radial seal, the oil chamber, the grease chamber and the volume compensator. This permits dimensionally stable and flush mounting of the sealing arrangement with respect to the shaft bearing independently of a type-specific geometry of a pump housing, as well as a provision as a unit or assembly.

BRIEF DESCRIPTION OF THE FIGURES

The invention will be described hereinafter with the aid of an exemplified embodiment in the example of use in a water pump with reference to the drawing. In the drawing:

FIG. 1 shows a longitudinal sectional view of the shaft bearing having the sealing arrangement according to one embodiment of the invention.

DETAILED DESCRIPTION OF THE INVENTION

FIG. 1 shows a shaft bearing 1 which, in the present example of use, is used in a pump housing of a water pump, not illustrated, between a pump chamber and an electric motor. The shaft bearing 1 is designed in the form of a sintered sliding bearing, i.e. a rotatory bearing portion 11 which absorbs radial forces of a rotating shaft 3 is designed as a sliding bearing bushing. The sliding bearing bushing is produced from a porous sintered metal alloy. The shaft 3, to be mounted, of the water pump is rotatably accommodated in the sliding bearing bushing through a radial bearing gap of less than 15 µm. Furthermore, a sliding property between the shaft 3 and the porous sintered material is assisted by means of a lubricant filling described hereinafter.

The sealed shaft bearing 1 is designed to seal the shaft 3, to be mounted, of the pump between a coolant side 4, which in the aforementioned design corresponds to the liquid medium in the pump chamber, and an air side 5, which in the aforementioned design corresponds to a drive side with an electric motor. A seal of the shaft bearing 1 is designed in particular to prevent a liquid medium, such as the coolant, from passing axially through the shaft bearing 1 even in the event of a pressure difference between the coolant side 4 and the air side 5. For this purpose, the shaft bearing 1 is equipped with a sealing arrangement 2. The sealing arrangement 2 of the shaft bearing 1 comprises a primary radial seal 24 to the coolant side 4, a secondary radial seal 25 to the air side, a seal-effective lubricant filling which contains a lubricating grease as well as a lubricating oil separately from one another, and a volume compensator 23.

The shaft bearing 1 has a bearing housing 12 which accommodates said sealing arrangement 2. The bearing housing 12 simplifies mounting of the shaft bearing 1 as a sealed compact bearing and its provision in the form of an assembly. In this regard, the bearing housing 12 fixes in particular the primary radial seal 24 and the secondary radial seal 25 relative to the rotatory bearing portion 11 and holds the included lubricant filling of the sealing arrangement 2. The cylindrical bearing housing 12 comprises an open end on the side illustrated on the left and comprises a radially inwardly bent base with a passage opening for the shaft 3 on the side illustrated on the right.

The primary radial seal 24 is arranged at an axial end of the shaft bearing 1. In cross-section, a flexible sealing core of the primary radial seal 24 comprises a sealing lip which forms a dynamic sealing surface which slides on a circumference of the shaft 3. The sealing core of the primary radial seal 24 is enclosed on both sides by pressed-in sheet metal shells, whereby a static sealing surface of the primary radial seal 24 directed towards the radial outer side is fixed to the bearing housing 12. The sealing lip of the primary radial seal 24 is inclined axially towards the outer side of the shaft bearing 1, i.e. towards the coolant side 4, and is additionally urged radially inwardly onto the shaft circumference by an annular spring.

The secondary radial seal 25 is arranged at the other axial end of the shaft bearing 1. The configuration of the secondary radial seal 25 is similar or, to simplify production, identical to the primary radial seal 24. In cross-section, a flexible sealing core of the secondary radial seal 25 also comprises a sealing lip which forms a dynamic sealing surface on the shaft circumference. Likewise, the sealing core of the secondary radial seal 25 is enclosed on both sides by pressed-in sheet metal shells, and is thus fixed to the bearing housing 12 with regard to a static sealing surface to the radial outer side. However, the sealing lip of the secondary radial seal 25 is axially inclined towards the inner side of the shaft bearing 1. The sealing lip of the secondary radial seal 25 is in turn additionally urged radially inwardly onto the shaft circumference by a ring spring.

An oil chamber 21, the volume of which is filled with a lubricating oil, is arranged in an annular shape between the secondary radial seal 25 and the rotatory bearing portion 11. The oil chamber 21 supplies the rotatory bearing portion 11, which is designed as a sliding bearing bushing, and so impregnation of the sliding surface or saturated impregnation of the porous structure of the sintered metal body is ensured. Therefore, with the small bearing clearance, a good sliding friction property with respect to the shaft 3 is achieved. The lubricating oil consists e.g. of a synthetic hydrocarbon, a silicone oil, an ester oil or the like, the viscosity of which is adjusted to a load on the radial bearing portion 11 or to an absorption by the porosity of the sintered material of the sliding bearing bush. The oil chamber 21 contributes to hermetic sealing of the shaft bearing 1, because the lubricating oil accommodated therein is in contact with the shaft circumference and the secondary radial seal 25. Furthermore, the lubricating oil lubricates the sealing lip of the secondary radial seal 25 on the air side 5.

In a radial free space of the primary radial seal 24, a grease chamber 22 is arranged in an annular shape between the sealing lip of the primary radial seal 24 and the radial bearing portion 11, the volume of said grease chamber being filled with a lubricating grease. The lubricating grease has a higher viscosity than the lubricating oil. The higher viscosity causes poorer absorption in the porosity of the sintered material. More precisely, no significant absorption occurs on the sintered metal of the sliding bearing bushing, which is already saturated with the lubricating oil of lower viscosity, and so a separation of the two lubricants occurs at the boundary between the grease chamber 22 and the radial bearing portion 11. Accordingly, in the present embodiment, in which a sliding bearing bushing made of a porous sintered metal is used as the radial bearing portion 11, no additional axial delimitation of the grease chamber 22 is absolutely necessary in order to avoid mixing or equalisation of the viscosities of the lubricating grease and the lubricating oil in the lubricant filling. The grease chamber 22 also contributes to hermetic sealing of the shaft bearing 1, because the lubricating grease accommodated therein is in contact with the shaft circumference and the primary radial seal 24. In this way, the lubricating grease prevents small leakages or coolant leakages from being drawn into the shaft bearing. In particular, a high viscosity of the lubricating grease prevents a diffusion of bubbles and a corresponding migration of bubbles of a gaseous steam leakage into the shaft bearing 1 in the event of pressure differences. Furthermore, the lubricating grease lubricates the sealing lip of the primary radial seal 24 on the coolant side 4.

An annular volume compensator 23 is arranged in a radial cut-out between the radial bearing portion 11 and the bearing housing 12. The volume compensator 23 consists of a flexible, non-sorptive material. In the present embodiment, the volume compensator 23 is produced from a cellular rubber, such as a foamed, closed-cell elastomer.

During operation of the water pump, not illustrated, the lubricants in the shaft bearing 1 heat up. This is accompanied by an increase in volume or rise in pressure of the lubricant filling in the shaft bearing 1. The compressibility of the volume compensator 23 serves to limit a rising internal pressure in the shaft bearing 1 by reason of the temperature-dependent change in volume of the lubricating oil and lubricating grease. However, compressibility is set in such a way that the temperature-dependent internal pressure in the shaft bearing 1 is at least greater than a temperature-dependent steam pressure of the coolant during operation. A pressure difference between the higher internal pressure in the shaft bearing 1 compared to the coolant side 4 is preferably set to up to 1 bar. Such a range of pressure differences can be absorbed over a long period of time by the primary radial seal 24 with the spring-loaded sealing lip without any impairment.

By compensating for an increase in volume, leakage of the lubricating oil or a long-term loss of the lubricants caused by numerous rises in pressure in the shaft bearing 1 is prevented. On the other hand, since there is a positive pressure difference between the lubricant filling in the shaft bearing 1 and the coolant side 4, no leakages of the coolant into the shaft bearing 1 are instigated. Furthermore, the pressure of the lubricant filling in the shaft bearing 1 leads to an optimised hydrodynamic lubricating oil supply to the spring-loaded sealing lip of the secondary radial seal 25, which runs almost in a wear-free manner on the air side 5 of the dry-running electric motor of the water pump.

To a limited extent, a pressure transfer from the volume of the lubricating grease to the absorbed volume of the lubricating oil is also possible at the material boundary to the porous sintered metal. Therefore, a volume compensation of a temperature-related volume variation of the lubricating grease can be achieved even without direct contact between the grease chamber 22 and the volume compensator 23. In this case, the lubricating oil located therebetween and absorbed in the sintered metal behaves in a comparable manner to an incompressible liquid cushion and transmits a pressure from the volume of the lubricating grease to the volume compensator 23.

In the illustrated embodiment, a modulus of elasticity of a closed-cell, foamed elastomer for the volume compensator 23 and a ratio of the body volume thereof to the volume of at least the lubricating oil are selected in dependence upon parameters including a specific volume change of the lubricating oil, a temperature difference of an operating temperature range of the coolant, and travel and a partial force along a displacement of a volume boundary surface between the body of the volume compensator 23 and the lubricating oil.

The lubricating oil is further selected according to the property that a temperature-dependent steam pressure of the lubricating oil within the operating temperature range of the coolant is lower than an air pressure on the air side 5. Therefore, a steam leakage to the air side 5 is prevented.

As an alternative to the illustrated embodiment, the inventive shaft bearing 1 having the sealing arrangement can be achieved in different embodiments which likewise correspond to the core of the invention and are part of the disclosure below.

In the illustrated embodiment, a direct connection can be provided between the grease chamber 22 and an effective surface of the volume compensator 23.

In further alternative embodiments, the volume compensator 23 can be arranged annularly between the grease chamber 22 and the radial bearing portion 11. The volume compensator 23 can comprise a shape other than an annular shape or other rotationally symmetrical shape. For example, the volume compensator 23 can comprise a prismatic shape or any one-piece body. Likewise, the volume compensator 23 can be formed from a plurality of bodies.

Furthermore, the oil chamber 21 can be arranged at a different axial position in the shaft bearing 1. The oil chamber 21 can comprise a shape other than an annular shape or other rotationally symmetrical shape.

A rolling bearing can be provided instead of a sliding bearing. In this case, the radial bearing portion 11 is not formed as a sliding bearing bushing but instead e.g. as a rolling bearing with an outer ring, a rolling bearing cage and two rows of rolling elements. Furthermore, in this case, a diaphragm or a radial seal can be provided to axially delimit the grease chamber 22 with respect to the volume of the lubricating oil. Otherwise, the volume compensator 23 can be designed for providing delimitation between the lubricating grease and the lubricating oil.

Likewise, the shaft bearing 1 in accordance with the invention can be produced without the bearing housing 12. In this case, the radial bearing portion 11 and the components of the sealing arrangement 2 are successively inserted and fixed in a housing portion of a pump or a surrounding system, wherein the oil chamber 21 and the grease chamber 22 are formed by corresponding free spaces between the components of the sealing arrangement 2 in the surrounding housing portion or system.

LIST OF REFERENCE NUMERALS 1 shaft bearing
2 sealing arrangement
3 shaft
4 coolant side
5 air side
11 rotatory bearing section
12 bearing housing
21 oil chamber
22 grease chamber
23 volume compensator
24 primary radial seal
25 secondary radial seal

The invention claimed is:

1. A shaft bearing having a sealing arrangement for radially mounting and sealing a shaft inside a housing of a coolant pump between a coolant side and an air side, comprising:
 a rotatory bearing portion for rotatably mounting the shaft;
 a primary radial seal for sealing a shaft circumference to the coolant side;
 a secondary radial seal for sealing a shaft circumference to the air side; and
 an oil chamber that takes in a volume of a lubricating oil; wherein
 a grease chamber surrounding a shaft circumference and receiving a volume of a lubricating grease having a higher viscosity than the lubricating oil and the coolant is arranged between the primary radial seal and the rotatory bearing portion; wherein
 a volume compensator including a compressible material is provided for compensating a temperature-dependent volume variation and is arranged such that the volume compensator interacts with the volume of the lubricating oil and the volume of the lubricating grease.

2. The shaft bearing having the sealing arrangement according to claim 1, wherein
 the volume compensator is formed of a closed-cell elastomer.

3. The shaft bearing having the sealing arrangement according to claim 2, wherein the volume compensator is formed annul arty.

4. The shaft bearing having the sealing arrangement according to claim 2, wherein
 the volume compensator is arranged between the volume of the lubricating grease and a total volume of the lubricating oil which includes the rotatory bearing portion and the oil chamber.

5. The shaft bearing having the sealing arrangement according to claim 2, wherein
 the rotatory bearing portion is provided by a sliding bearing bushing formed of a porous sintered metal and impregnated with the lubricating oil.

6. The shaft bearing having the sealing arrangement according to claim 2, wherein
 the grease chamber is accommodated in a radially inner cut-out of the primary radial seal.

7. The shaft bearing having the sealing arrangement according to claim 1, wherein
 the volume compensator is formed annularly.

8. The shaft bearing having the sealing arrangement according to claim 7, wherein
 the volume compensator is arranged between the volume of the lubricating grease and a total volume of the lubricating oil which includes the rotatory bearing portion and the oil chamber.

9. The shaft bearing having the sealing arrangement according to claim 7, wherein
 the rotatory bearing portion is provided by a sliding bearing bushing formed of a porous sintered metal and impregnated with the lubricating oil.

10. The shaft bearing having the sealing arrangement according to claim 7, wherein
 the grease chamber is accommodated in a radially inner cut-out of the primary radial seal.

11. The shaft bearing having the sealing arrangement according to claim 1, wherein
 the volume compensator is arranged between the volume of the lubricating grease and a total volume of the lubricating oil which includes the rotatory bearing portion and the oil chamber.

12. The shaft bearing having the sealing arrangement according to claim 11, wherein
 the rotatory bearing portion is provided by a sliding bearing bushing formed of a porous sintered metal and impregnated with the lubricating oil.

13. The shaft bearing having the sealing arrangement according to claim 11, wherein
 the grease chamber is accommodated in a radially inner cut-out of the primary radial seal.

14. The shaft bearing having the sealing arrangement according to claim 1, wherein
 the rotatory bearing portion is provided by a sliding bearing bushing formed of a porous sintered metal and impregnated with the lubricating oil.

15. The shaft bearing having the sealing arrangement according to claim 14, wherein
 the volume compensator is accommodated in a radially external cut-out of the sliding bearing bushing.

16. The shaft bearing having the sealing arrangement according to claim 14, wherein
 the grease chamber is accommodated in a radially inner cut-out of the primary radial seal.

17. The shaft bearing having the sealing arrangement according to claim 1, wherein
 the grease chamber is accommodated in a radially inner cut-out of the primary radial seal.

18. The shaft bearing having the sealing arrangement according to claim 1, wherein
 the oil chamber is arranged between the secondary radial seal and the rotatory bearing portion and surrounds the shaft circumference.

19. The shaft bearing having the sealing arrangement according to claim 1, wherein
   a sealing lip of the primary radial seal and a sealing lip of the secondary radial seal are formed pointing in the direction of the coolant side in relation to the shaft circumference.

20. The shaft bearing having the sealing arrangement according to claim 1, further comprising
   a bearing housing that collectively surrounds the rotatory bearing portion, the primary radial seal, the secondary radial seal, the oil chamber, the grease chamber and the volume compensator.

\* \* \* \* \*

UNITED STATES PATENT AND TRADEMARK OFFICE
CERTIFICATE OF CORRECTION

PATENT NO. : 11,746,827 B2
APPLICATION NO. : 17/766012
DATED : September 5, 2023
INVENTOR(S) : Franz Pawellek and Marcel Berner It is certified that error appears in the above-identified patent and that said Letters Patent is hereby corrected as shown below:

In the Claims

Claim 3, Column 9, Line 61, delete "annul arty" and insert --annularly--.

Signed and Sealed this
Thirty-first Day of October, 2023

Katherine Kelly Vidal
*Director of the United States Patent and Trademark Office*